United States Patent
Chemerda et al.

[15] 3,658,668
[45] Apr. 25, 1972

[54] METHOD PREPARING PHOSPHONIC ACID DERIVATIVES

[72] Inventors: John M. Chemerda, Watchung; William C. Lumma, Plainfield, both of N.J.

[73] Assignee: Merck & Co., Inc., Rahway, N.J.

[22] Filed: Aug. 31, 1970

[21] Appl. No.: 68,562

[52] U.S. Cl. ...........................................204/158
[51] Int. Cl. ..........................................B01j 1/10
[58] Field of Search.................................204/158

[56] References Cited

UNITED STATES PATENTS 3,496,080  2/1970  Harris........................204/158

*Primary Examiner*—Howard S. Williams
*Attorney*—I. Louis Wolk, J. Jerome Behan and John Frederick Gerkens

[57] ABSTRACT

Processes for the preparation of (±)-(cis-1,2-epoxypropyl)phosphonic acid, amides, esters and salts thereof by photolytic rearrangement of 1,2-propenyl phosphates using ultraviolet radiation are disclosed. Also disclosed is the photolytic rearrangement using ultraviolet radiation and the inclusion of a photosensitizing agent. The compounds thus produced are useful as antimicrobial agents.

5 Claims, No Drawings

METHOD PREPARING PHOSPHONIC ACID DERIVATIVES

SUMMARY OF THE INVENTION

This invention relates to a novel method for the preparation of salts, amides and esters of (±)-(cis-1,2-epoxypropyl)phosphonic acid and (−)-(cis-1,2-epoxypropyl)phosphonic acid which are useful respectively as antimicrobials and as intermediates in the preparation of (±)-(cis-1,2-epoxypropyl)phosphonic acid and (−)-(cis-1,2-epoxypropyl)phosphonic acid.

In accordance with this invention (±)-(cis-1,2-epoxypropyl)phosphonic acid and amides, esters and salts thereof are prepared by photolytically rearranging the corresponding 1,2-propenylphosphates. The (±)-(cis-1,2-epoxypropyl)phosphonic acid and amides, salts and esters thereof are prepared by irradiating the corresponding 1,2-propenylphosphate with ultraviolet radiation. In the reaction scheme below the 1,2-propenylphosphate compound (I) is in tautomeric equilibrium with the 2-phosphono-1-propanal compound (II). In order to avoid duplication of nomenclature, throughout this specification the 1,2-propenyl phosphate terminology will be employed. However, it is to be understood that the use of said single name over the other does not preclude the use of the propanal compounds in the instant process. The irradiation being incident upon either isomer will result in the formation of a single product (III). The rearrangement is best shown by the following reaction scheme:

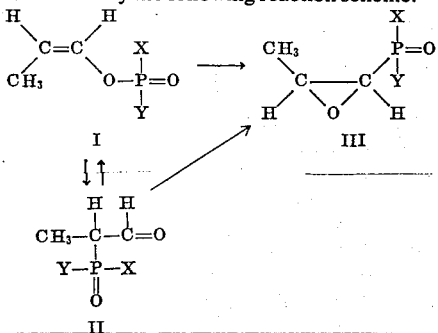

wherein X is hydrogen, loweralkoxy, loweralkenyloxy, aryl, for example phenyl and substituted phenyl in which the substitution is loweralkyl and halogen; aralkoxy such as benzyloxy and substituted benzyloxy in which the substitution is loweralkyl or halogen; loweralkanoyloxymethoxy; —OM where O is oxygen and M is a metal, or amine cation, preferably the cation derived from an alkali metal or an alkaline earth metal such as the cation derived from sodium, potassium, lithium, magnesium, or calcium; an amine or substituted amine in which the substitution is loweralkyl, and also in which an alkylene linkage may interconnect an oxygen of X and an oxygen of Y, forming a cyclic dioxy derivative; and an alkyl or aralkyl ammonium salt such as methyl ammonium, ethyl ammonium, benzyl ammonium and phenethyl ammonium salts. Y is defined in the same manner as is X although in a single compound, Y need not necessarily be the same as X.

When, in the instant application, reference is made to "lower" as in "loweralkoxy" or "loweralkyl," what is meant is that the carbon chain consists of from 1 to 5 carbon atoms in which said chain may be straight or branched. Included in the definition are methoxy, ethoxy, propoxy, tertiary butoxy, amyloxy, methyl, ethyl, isopropyl, butyl, amyl, and the like. When reference is made to "halogen" what is meant is fluorine, chlorine, bromine, and iodine. The substituted aryl and aralkyl groups above include substitution at the ortho, meta, and para positions of the benzene nucleus as well as multiple substitutions thereon. When X and Y are defined as being divalent alkaline earth metals such as calcium, they are construed to be one and the same with both oxygen atoms of the phosphonic acid ionically bonded to a single divalent metallic ion.

The process of the instant invention, when effected by irradiation of the starting material (I or II), recovers the racemic mixture of products III which may be represented by the symbols (±) or (dl). This is taken by those skilled in the art to mean that the product is a 50:50 mixture of two optically pure compounds, each of which is the mirror image of the other, one compound being represented by the symbol (+) and the other by the symbol (−) depending on their optical rotation.

PREFERRED EMBODIMENTS OF THE INVENTION

In one embodiment of the invention, 1,2-propenyl phosphate is rearranged by dissolving it in a suitable, non-reactive solvent and treating it with high intensity light. The solvents found to be suitable are lower molecular weight organic solvents. Those preferred solvents have been found to be loweralkanols such as methanol, ethanol, propanol, and the like; lower ketones such as acetone or methyl ethyl ketone; ethers and diethers such as diethyl ether and 1,2-dimethoxy ethane; hydrocarbon solvents, of up to 8 carbon atoms both linear and cyclic such as pentane, hexane or cyclohexane; and aromatic solvents of up to 8 carbon atoms such as benzene or toluene. Both the intensity and wavelength of the irradiation will determine the duration of the reaction, and the temperature at which it is run. It has been found best to utilize a mercury arc lamp of greater than or equal to 200 watts output at a temperature of from room temperature to the reflux temperature of the particular solvent employed, for a duration of from 1 to 24 hours. The reaction is generally complete in from 5 to 15 hours in a solvent refluxing at a temperature of from 50° to 100° C. Isolation of the product is effected by standard laboratory techniques known to those skilled in the art such as evaporation of solvents and recrystallization of residues, to afford pure products.

The particular radiation preferred for the rearrangement is that from a mercury vapor lamp of either the high or low pressure type. However, other light sources including sunlight have been found useful.

The wavelength of light emanating from the irradiation source may be controlled by the choice of light source itself such as the continuous broad spectrum of light present in sunlight or the more narrow selection of wavelengths from mercury vapor lamps. The frequency of irradiation may be made even more narrow or selective by the use of filtering elements which absorb all but certain wavelengths which are transmitted. These filtering elements may be composed of partially absorbing glass or other substance, chemical solutions, or a combination thereof. The wavelength of light which is to be used in general depends on the substituents X and Y. The nature of X and Y will affect the chromophore of I and II and thus affect the wavelength of light the particular molecule will absorb. In general, only wavelengths longer than 180 nanometers and shorter than 400 nanometers will be useful, a nanometer being equivalent to one-billionth of a meter of 1 millimicron and abbreviated herein as nm.

In a variation of the above process the irradiation proceeds with the inclusion of a photosensitizing agent. This photosensitizing agent in many cases may be the solvent employed in the reaction or it may be a separate agent added to the solvent which serves as a photosensitizing agent. The purpose of the photosensitizing agent is to absorb the energy being introduced into the system by the irradiation and to transfer that energy to the 1,2-propenylphosphate (I) or 2-phosphono-1-propanal (II) thereby effecting the rearrangement to the (cis-1,2-epoxypropyl)phosphonic acid and derivatives thereof. This energy, after being absorbed by the photosensitizing agent will usually, but not always, be transferred to the starting materials I and II by means of molecular collisions. This process is known to those skilled in the art as photochemical energy transfer or sensitization.

Photochemical sensitization is capable of producing reactive excited states of the 1,2-propenylphosphates (I) or phosphonopropanals (II) which may not be formed by direct irradiation. The photosensitizing agent may absorb a wavelength of light the starting material is incapable of absorbing, however, the excited photosensitizing agent may be very capable of transferring this absorbed energy to the starting material. Thus the photosensitizing agent broadens the choice of wavelengths available with which to affect the rearrangement. Although a certain compound only may absorb very few wavelengths, with the proper choice of photosensitizing agent a much wider choice of wavelengths is available.

Upon irradiation, the photosensitizing agent may be pushed into many types of intermediate reactive states. Among them can be a singlet state, a triplet state, or charge transfer state; they may form excimers, photoionized or dissociated species, and the like. The addition of inorganic salts and other reagents has been found useful in that the stability of the intermediate excited state is affected and such a longer or shorter duration of the excited state may have an effect upon the outcome of the reaction.

The photosensitizing agent is generally selected from organic compounds such as loweralkanones such as acetone, methylethyl ketone, (or 3-pentanone); aromatic ketones such as acetophenone, benzophenone; or phenyl cyclopropyl ketone, aromatic hydrocarbons such as benzene, naphthalene, and the like.

The rearrangement reactions of the instant invention are seen to work equally well when the starting material is the acid or the salt or ester derivative of the 1,2-propenylphosphate. The substitution on the phosphate group of the starting material is not altered during the reaction but the substitutions on the phosphonate group of the product may, if desired, be changed to other groups.

The instant process is intended to include other functionally equivalent methods of preparation. Therefore, any modification of this synthesis which results in the formation of an identical product should be construed as constituting an analogous method. The claimed process is capable of wide variation and modification and, therefore, any minor departure therefrom or extension thereof is considered as being within the scope of this invention.

The following examples are included in order that the invention shall be more fully understood. They are not included for purposes of limitation of the invention.

EXAMPLE 1

Calcium-(±)-(cis-1,2-epoxypropyl)phosphonate

A. A slurry of 1.82 g. (0.01 Moles) of disodium-cis-propenylphosphate in 500 ml. of water in a quartz flask fitted with a nitrogen gas sparger is irradiated under $N_2$ at a distance of 3 cm. with a 500 watt high pressure quartz mercury arc for 26 hours at 50°C. The reaction mixture is then cooled and the solvent evaporated in vacuo. The residue is dissolved in methanol, treated with decolorizing carbon and the solvent then re-evaporated. On cooling, spontaneous crystallization yields disodium-(±)-(cis-1,2-epoxypropyl)phosphonate. A small amount of the (±)-trans isomer is formed presumably due to photochemical isomerization of the starting cis to trans propenylphosphate.

B. A stirred solution solution of 1.82 g. (0.01 Moles) of disodium-cis-propenyl phosphate in 400 ml. of a 1:1 mixture of methanol and acetone is irradiated in a pyrex flask under nitrogen for two days with a 450 watt high pressure immersion lamp surrounded by a 2 mm thick sleeve of vycor glass to filter out wave lengths less than 240 nm. Evaporation of the solvent in vacuo followed by dilution with 100 ml. of methanol and decolorization with carbon results in a solution which, upon the addition of 1.58 g. (0.01 Moles) of calcium acetate precipitates calcium-(±)-(cis-1,2-epoxypropyl)phosphonate. Filtration of the product followed by recrystallization from ethanol affords pure material. In this experiment acetone absorbs most of the incident light and functions as a sensitizer, transferring its energy of excitation to starting propenylphosphate forming an excited state of the latter which then reacts.

EXAMPLE 2

Calcium-(±)-(cis-1,2-epoxypropyl)phosphonate

A. Diethyl-(±)-(cis-1,2-epoxypropyl)phosphonate

A solution of 19.4 g. ( 0.1 Mole) of diethyl-cis-propenylphosphate in 100 ml. of methylbenzoate is irradiated under nitrogen in a quartz vessel with the mercury lamp of Example 1B for 24 hours maintaining the temperature at 85° to 100°C. with an external steam bath. The solvent is removed by fractional vacuum distillation. This is followed by a fraction of pure diethyl-(±)-(cis-1,2-epoxypropyl)phosphonate, boiling point 75° to 78°C./0.6 mm. Hg.

When in the above procedure dimethyl-cis-propenylphosphate or di-propyl-cis-propenylphosphate is employed in place of diethyl-cis-propenylphosphate, there is obtained dimethyl-(±)-(cis-1,2-epoxypropyl)-phosphonate and dipropyl-(±)-(cis-1,2-epoxypropyl)-phosphonate, respectively.

B. (±)-(cis-1,2-epoxypropyl)phosphonic acid

The diethyl(±)-(cis-1,2-epoxypropyl)phosphonate is dissolved in 10 ml. of trimethylchlorosilane and refluxed for eight hours. On cooling, the reaction mixture is diluted by the addition of ice water to yield an aqueous solution of (±)-(cis-1,2-epoxypropyl)phosphonic acid. The solution can be evaporated to afford the free acid which melts at 80°C. or the solution may be used as is in the next step.

When in the above procedure dimethyl-(±)-(cis-1,2-epoxypropyl)phosphonate and dipropyl -(±)-(cis-1,2-epoxypropyl)phosphonate are employed in place of diethyl-(cis-1,2-epoxypropyl)phosphonate there is obtained (±)-(cis-1,2-epoxypropyl)phosphonic acid in comparable yields.

C. Calcium-(±)-(cis-1,2-epoxypropyl)phosphonate

The aqueous solution of B above is adjusted to a pH of 8.0 with 10% sodium hydroxide. The mixture is diluted with methanol and 1.58 g. (0.01 Mole) of calcium acetate and added to the solution. The precipitate is filtered and recrystallized from ethanol to afford pure calcium-(±)-(cis-1,2-epoxypropyl)phosphonate.

EXAMPLE 3

(+)-α-Phenethylammonium salt of (−)-(cis-1,2-epoxypropyl)-phosphonate

A. Dibenzyl-(±)-(cis-1,2-epoxypropyl)phosphonate

A stirred solution of 6.4 g. (0.02 Mole) of dibenzyl-cis-propenylphosphate in 100 ml. of cyclohexane is irradiated with a 500 watt immersion high pressure mercury lamp at a temperature of 80°C. (reflux temperature of the solvent). The solvent is evaporated and the residue, on crystallization from benzene, affords pure dibenzyl-(±)-(cis-1,2-epoxypropyl)phosphonate.

When in the above procedure di-(p-chlorobenzyl)-cis-propenylphosphate and di-(o-tolyl)-cis-propenylphosphate are employed in place of dibenzyl-cis-propenylphosphate, there is obtained di-(p-chlorobenzyl)-(±)-(cis-epoxypropyl)-phosphonate and di-(o-tolyl)-(±)-(cis-1,2-epoxypropyl)-phosphonate, respectively.

B. (+)-α-phenethylammonium salt of (−)-(cis-1,2-epoxypropyl)phosphonate

The material from A above is dissolved in 40 ml. of ethanol and to this is added 0.5 g. of 5% palladium on charcoal. The mixture is shaken with hydrogen under 45 p.s.i. at room temperature until no further hydrogen uptake is observed. The reaction is filtered and to the filtrate is added 2.42 g. (0.02 Mole) of (+)-α-phenethylamine. The solution, on concentration to a small volume gives the (+)-α-phenethylammonium salt of (−)-(cis-1,2-epoxypropyl)-phosphonate, melting point 169° to 171°C.

When in the above procedure Raney nickel or Adams catalyst is used in place of 5% palladium on charcoal there is obtained, in comparable yields, the same product.

When in the above procedure di-(p-chlorobenzyl)-(±)-(cis-1,2-epoxypropyl)phosphonate and di-(o-tolyl)-(±)-(cis-1,2-epoxypropyl)phosphonate are employed in place of dibenzyl-(±)-(cis-1,2-epoxypropyl)phosphonate there is obtained the (+)-α-phenethylammonium salt of (−)-(cis-1,2-epoxypropyl)phosphonate in comparable yield.

EXAMPLE 4

Benzylammonium-(±)-(cis-1,2-epoxypropyl)phosphonate
A. di-Tertiarybutyl-(cis-1,2-epoxypropyl)phosphonate A slurry of 5.6 g. (0.02 Mole) of di-tertiary-butyl-(cis-propenyl)phosphate in 100 ml. of tetrahydrofuran is heated to reflux and the resulting solution irradiated for 6 hours with a 500 watt mercury immersion lamp under $N_2$. The reaction mixture is treated with decolorizing carbon and filtered to afford a nearly colorless solution of di-tertiary butyl phosphonate ester. The solution can be evaporated to dryness to afford di-tertiarybutyl-(cis-1,2-epoxypropyl)phosphonate, or used as is in the next step.

B. Benzylammonium-(±)-(cis-1,2-epoxypropyl)phosphonate

The solution of A above is treated with 100 mg. of methane sulfonic acid for 15 minutes at reflux temperature. The solution is cooled and neutralized with 2.14 g. (0.02 M.) of benzylamine. The solution is slowly evaporated until crystallization is observed. The suspension on cooling affords benzylammonium-(±)-(cis-1,2-epoxypropyl)phosphonate, melting point 152° to 155°C.

EXAMPLE 5

Diethyl-(±)-(cis-1,2-epoxypropyl)phosphonate

A solution of 1.94 g. (0.01 Mole) of diethyl-cis-propenylphosphonate in 550 ml. of 1,1,2-trichloro-1,2,2-trifluoroethane is degassed with a fine stream of dry nitrogen from a gas sparger and then irradiated under nitrogen with 450 watt high pressure mercury immersion lamp surrounded by a 2 mm. thick cylindrical filter sleeve of corex glass which excludes light of wavelength shorter than 260 mm. The reaction is followed by infrared examination of aliquots until the carbonyl absorption of starting material has disappeared (ca. 4 hours at room temperature). The solvent is evaporated in vacuo and the residue distilled in vacuo giving pure diethyl-(±)-(cis-1,2-epoxypropyl)phosphonate, boiling point 78° to 82°C./0.5 mm Hg.

EXAMPLE 6

Cis and trans-1-propenyl-(o-phenylene)phosphonate

A pump circulated solution of 1,000 ml. of a 1 percent wt.-vol. solution of o-phenylene cis-propenylphosphonate in absolute ethanol containing 15 grams of phenylcyclopropyl ketone as a photosensitizing agent, is irradiated under nitrogen through a 3 cm. thick pyrex filter with a 1,000 watt mercury-xenon arc lamp having a collimated beam of broad spectrum light whose focal point is the center of a quartz, water jacketed reaction vessel. Disappearance of starting material is monitored by disappearance of the aldehyde proton nmr signal (ca. 8 hours at room temperature) in aliquots.

The ethanol and sensitizer are removed in vacuo leaving a gummy residue which crystallizes on trituration with benzene containing 1% petroleum ether. Column chromatography of crude material on silica gel using methanolbenzene eluent affords both cis and trans-1-propenyl-(o-phenylene)phosphonate.

When in the above procedure methyl ethyl ketone, acetophenone, or benzene is employed in place of phenylcyclopropyl ketone there is obtained the same cis and trans products in comparable yield.

The products obtained via the above processes may, if desired, be converted to (cis-1,2-epoxypropyl)-phosphonic acid or its salts by any suitable means as, for example, by hydrolytic means such as comprises treating said esters with an aqueous solution of an acid such as hydrochloric acid or sulfuric acid at carefully controlled pH or with an aqueous solution of a base such as an alkali metal or alkaline earth metal carbonate, bicarbonate, oxide or hydroxide or, alternatively, by treatment with trimethylchlorosilane followed by aqueous hydrolysis; or by hydrogenolysis; or via the application of suitable reductive, displacement or oxidative means; or by treatment of the said esters or amides with a photochemical agent. The choice of a suitable method for the conversion of the said esters and amides to (cis-1,2-epoxypropyl)phosphonic acid or its salts depends to a large extent upon the character of the ester moiety comprising the phosphonate portion of the molecule. For example, when the ester is a dimethyl ester, the conversion to (cis-1,2-epoxypropyl)phosphonic acid is most advantageously conducted by treating the said ester with trimethylchlorosilane followed by the aqueous hydrolysis of the silane ester intermediate thus obtained to afford the free acid. The alkysilane ester interchange is accomplished by refluxing the silane compound, such as chlorotrimethylsilane, with the alkyl ester in an inorganic solvent such as hexane, benzene and the like. In addition to the foregoing, the alkyl esters of (cis-1,2-epoxypropyl)-phosphonic acid and the aryl analogs thereof, including esters of mixed function such as (cis-1,2-epoxypropyl)-phosphonate wherein one ester moiety is derived from phenol, naphthol and the like, may be converted to the free acid by alkaline hydrolysis. However, in view of the high degree of stability of the dialkyl esters it is not uncommon to find that the treatment of a dialkyl (cis-1,2-epoxypropyl)-phosphonate with an aqueous solution of a base usually affords the monoalkyl ester intermediate and, therefore, the ultimate conversion of the alkyl diester to the salt or free acid necessitates a second step, such as treatment with a photochemical agent or an acidic reagent in order to effect the removal of the remaining alkyl ester moiety.

Hydrogenolysis is particularly effective in converting the alkenyl esters of (cis-1,2-epoxypropyl)-phosphonic acid to the corresponding free acid and, preferably, the hydrogenation is conducted in the presence of a Raney nickel catalyst and a base such as triethylamine, pyridine, dimethylaniline and the like, within a temperature range of from about room temperature up to about 200°C. Suitable inert organic solvents which may be employed and the hydrogenation process include, for example, methanol, ethanol, ethyl acetate, acetic acid, dimethyl ether, diethyl ether, tetrahydrofuran, hexane, xylene, benzene and the like.

The nuclear carbons comprising the epoxide ring in the instant products (III) are asymmetric in character and, therefore, the said products may be obtained in the form of one or more of four optically active isomers. In this connection it should be noted that (−)-(cis-1,2-epoxypropyl)phosphonic acid and its salts are particularly effective in inhibiting the growth of pathogenic bacteria and, therefore, the preparation of that isomer constitutes a preferred embodiment of this invention.

The (−)-(cis-1,2-epoxypropyl)phosphonic acid referred to herein rotates plane-polarized light in a counter-clockwise direction (to the left as viewed by the observer) when the rotation of its disodium salt is measured in water (5 percent concentration) at 405 mμ.

The designation cis used in describing the (1,2-epoxypropyl)phosphonic acid compounds means that each of the hydrogen atoms attached to carbon atoms 1 and 2 of the propylphosphonic acid are on the same side of the oxide ring.

The said (±)- and (−)-(cis-1,2-epoxypropyl)-phosphonic acid derivative and its salts are antimicrobial agents which are useful in inhibiting the growth of gram-positive and gram-negative pathogenic bacteria. The (−)-form of (cis-1,2-epoxypropyl)phosphonic acid and particularly its sodium and calcium salts, are active against *Bacillus, Escherichia, Staphylococci, Salmonella* and *Proteus* pathogens, and antibiotic-resistant strains thereof. Illustrative of such pathogens are *Bacillus subtilis, Escherichia coli, Salmonella schottmueleri, Salmonella gallinarum, Salmonella pullorum, Proteus vul-* garis, *Proteus mirabilis, Proteus morganii, Staphylococcus aureus* and *Staphylococcus pyogenes*. Thus, (±)- and (−)-(cis-1,2-epoxyproypl)phosphonic acid and the salts thereof can be used as antiseptic agents to remove susceptible organisms from pharmaceutical, dental and medical equipment and can also be used in other areas subject to infection by such organisms. Similarly, they can be used to separate certain microorganisms from mixtures of microorganisms.

The compounds of this invention are also useful as a biostatic agent in papermill white water. (−)-(cis-1,2-epoxypropyl)phosphonic acid is effective in reducing the bacterial population of white water when used in concentrations as low as 0.8 percent. The activity is noted immediately after addition of the compound, and is seen to persist for a period in excess of 48 hours.

What is claimed is:

1. A process for the preparation of a compound having the formula:

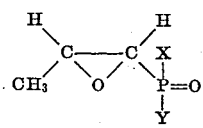

wherein X and Y can be the same or different and are selected from the group consisting of hydroxyl, lower-alkoxy, loweralkenyloxy, phenoxy, phenoxy substituted with loweralkyl, loweralkanoyloxy, amine, amine substituted with loweralkyl, OM where O is oxygen and M is the cation derived from a metal or an amine; which comprises treating a compound having the formula:

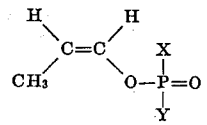

wherein X and Y are as defined above, with a source of ultraviolet irradiation.

2. A process as defined in claim 1 in which the irradiation is effected at a temperature of from 50° to 150°C. in a solvent selected from the group consisting of loweralkanols; lowerketones, lower ethers, diethers and cyclic ethers; hydrocarbons of up to 8 carbon atoms; and aromatic hydrocarbons of up to 8 carbon atoms.

3. A process as defined in claim 1 in which the mercury vapor lamp is of an intensity greater than 200 watts.

4. A process as defined in claim 1 which includes a photosensitizing agent.

5. A process as defined in claim 4 in which the photosensitizing agent is selected from the group consisting of loweralkonones, aromatic ketones and aromatic hydrocarbons.

* * * * *